(12) United States Patent
Yang (10) Patent No.: US 8,766,601 B2
(45) Date of Patent: *Jul. 1, 2014

(54) MULTI-MODE POWER MANAGEMENT UNIT

(75) Inventor: Ken Guo Chi Yang, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 13/238,968

(22) Filed: Sep. 21, 2011

(65) Prior Publication Data

US 2012/0007562 A1   Jan. 12, 2012

Related U.S. Application Data

(63) Continuation of application No. 12/077,844, filed on Mar. 21, 2008, now Pat. No. 8,026,697.

(60) Provisional application No. 60/926,634, filed on Apr. 27, 2007.

(51) Int. Cl.
*H02J 7/00* (2006.01)
*G06F 1/32* (2006.01)

(52) U.S. Cl.
USPC ............................................ 320/135; 702/132

(58) Field of Classification Search
USPC .......... 320/135, 127; 324/76.11; 702/63, 132; 365/226; 713/300, 321, 322, 323, 340
See application file for complete search history.

(56) References Cited

U.S. PATENT DOCUMENTS

| 6,470,290 | B1 * | 10/2002 | Lee et al. ...................... 702/132 |
| 6,735,707 | B1 * | 5/2004 | Kapil ............................ 713/322 |
| 7,639,540 | B2 * | 12/2009 | Kim et al. ................ 365/185.18 |
| 2009/0174366 | A1 * | 7/2009 | Ahmad et al. ................ 320/114 |

* cited by examiner

*Primary Examiner* — Hoai-An D Nguyen
(74) *Attorney, Agent, or Firm* — Oblon, Spivak, McClelland, Maier & Neustadt, L.L.P.

(57) ABSTRACT

According to one exemplary embodiment, a multi-mode power management unit (PMU) includes a number of switchable conductive paths, where each of the switchable conductive paths corresponds to at least one of a number of power modes. The multi-mode PMU further includes a shared inductor residing in each of the switchable conductive paths. A current can flow through the shared inductor in a same direction in each of the power modes. The multi-mode PMU further includes a controller configured to set one of the power modes using one of the switchable conductive paths. The power modes can include a battery-to-electronic system power mode and a charge-battery power mode. The power modes can further include a battery-to-electronic system/camera flash power mode, a power port-to-electronic system/battery power mode, and a battery-to-electronic system/backlight LED power mode.

20 Claims, 8 Drawing Sheets

MULTI-MODE POWER MANAGEMENT UNIT

This is a continuation of application Ser. No. 12/077,844 filed Mar. 21, 2008 now U.S. Pat. No. 8,026,697.

The present application claims the benefit of and priority to a provisional patent application entitled "Multi-Function Power Converter Using One Inductor," Ser. No. 60/926,634 filed on Apr. 27, 2007. The disclosure in that pending provisional application is hereby incorporated fully by reference into the present application.

BACKGROUND OF THE INVENTION

1. Field of the Invention

The present invention generally relates to the field of electrical circuits and systems. More particularly, the invention relates to circuits and systems for power management.

2. Background Art

Electronic devices, such as cellular phones, MP3 players, portable digital assistants (PDAs), and other mobile electronic devices, typically include a power management unit (PMU) for integrating various power-related functions, such as battery charging from a computer USB port or an AC power adaptor or supplying power to a USB On-The-Go (OTG) device, such as a USB hard drive, backlight LEDs, or a camera flash. In addition to the above functions, a typical PMU in an electronic device, such as a cellular phone, MP3 player, or PDA, also provides the device's system power, which may originate from, for example, the device's internal battery, a USB port on a computer, or an AC power adaptor.

To provide the above power-related functions in an electronic device, such as a mobile electronic device, a conventional PMU typically includes a separate circuit for each function. For example, the conventional PMU can include a buck-boost circuit for converting a battery voltage to a required system voltage. The conventional PMU can further include battery charger circuits for charging the electronic device's battery from an external power source, such as an AC power adaptor, USB port on a computer, or USB OTG device. The conventional PMU can further include circuits for providing power to backlight LEDs, which can illuminate a liquid crystal display (LCD), and a camera flash LED. In the conventional PMU, the aforementioned circuits typically include a number of distinct and separate inductors and one or more controllers. As a result, the conventional PMU can consume an undesirable amount of limited space in an electronic device, such as a mobile electronic device.

SUMMARY OF THE INVENTION

A multi-mode power management unit with shared inductor substantially as shown in and/or described in connection with at least one of the figures, as set forth more completely in the claims.

DETAILED DESCRIPTION OF THE INVENTION

The present invention is directed to a multi-mode power management unit with shared inductor. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed to merely exemplary embodiments of the invention. To maintain brevity, other embodiments of the present invention are not specifically described in the present application and are not specifically illustrated by the present drawings.

Figure 1:
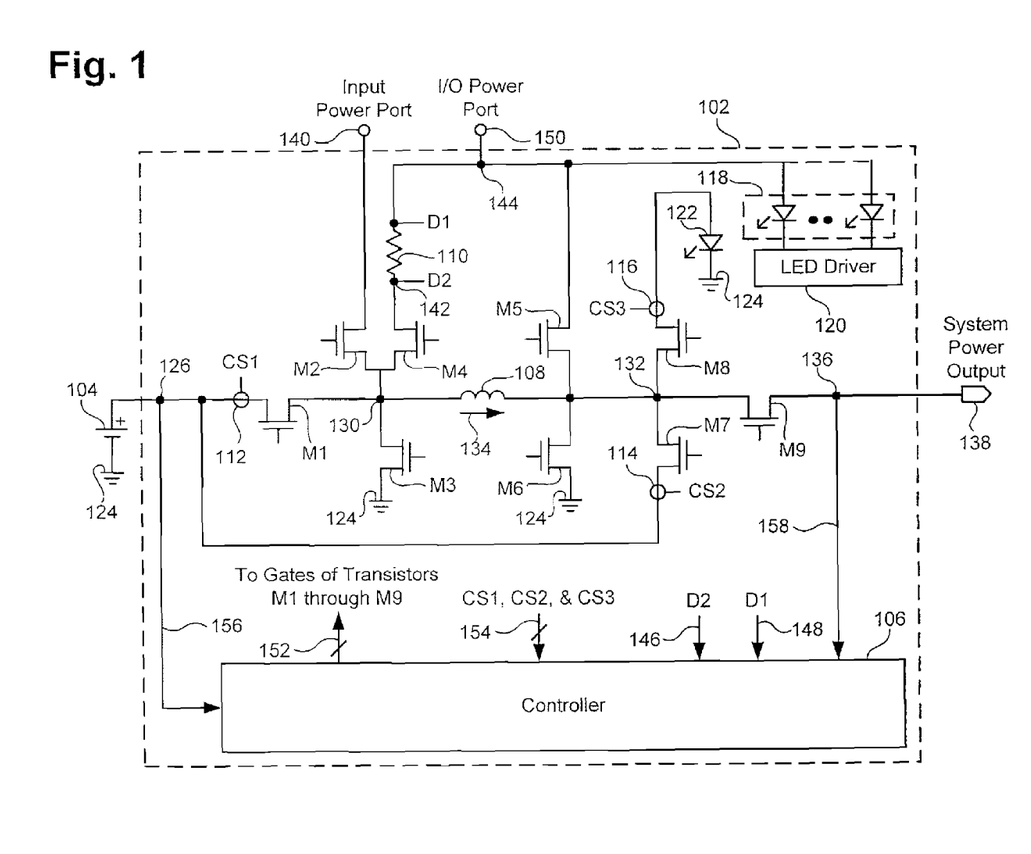
FIG. 1 illustrates a circuit diagram of an exemplary multi-mode PMU (power management unit) coupled to a battery in accordance with one embodiment of the present invention.

FIG. 1 shows a circuit diagram of multi-mode PMU (power management unit) 102 coupled to battery 104 in accordance with one embodiment of the present invention. Multi-mode PMU 102 includes controller 106, shared inductor 108, current sense resistor 110, current sensors 112, 114, and 116, backlight LEDs 118, LED driver 120, camera flash 122, and transistors M1, M2, M3, M4, M5, M6, M7, M8, and M9 (hereinafter "transistors M1 through M9"). Transistors M1 through M9 can each comprise a switching transistor, such as a switching field effect transistor (FET). To prevent undesired current flow through the body diodes of M1, M2, M4, M5, M7, M8, and M9, two back-to-back transistors may be used (not shown). For simplicity, only one transistor is shown. Multi-mode PMU 102 can reside in an electronic device, such as a mobile electronic device, which can include, for example, a cell phone, an MP3 player, or a PDA. Multi-mode PMU 102 can be fabricated on a single semiconductor die and can operate in a number of power modes, which can be set by controller 106. Each of the power modes of multi-mode PMU 102 can utilize at least one of a number of switchable conductive paths, which are further discussed below in relation to FIGS. 2, 3, 4, 5, 6, and 7.

As shown in FIG. 1, the negative terminal of battery 104 is coupled to ground 124 and the positive terminal of battery 104 is coupled to node 126, which provides a battery input port of multi-mode PMU 102. Battery 104 can be a 2.5 volt battery, a 4.2 volt battery, or other suitable voltage battery. Also shown in FIG. 1, transistor M1 is coupled between nodes 126 and 130, current sensor 112 is coupled to the line between node 126 and transistor M1, and the output of current sensor 112 (indicated by CS1) is coupled to a current sensor input of controller 106. Current sensor 112 can be utilized to monitor the current flowing through transistor M1 without consuming a significant amount of current. For example, current sensor 112 can be utilized to measure the "Rdson resistance" of transistor M1 by using a current mirror so as to determine the current flowing through transistor M1. The "Rdson resistance" refers to the source-to-drain resistance of a transistor when it is turned on.

Further shown in FIG. 1, transistor M3 is coupled between node 130 and ground 124, shared inductor 108 is coupled between nodes 130 and 132, and transistor M6 is coupled between node 132 and ground 124. Shared inductor 108 is utilized in all of the power modes of multi-mode PMU 102. The current flowing through inductor 108 flows in the same direction (indicated by arrow 134) in all of the power modes of multi-mode PMU 102, thereby allowing multi-mode PMU 102 to operated at high frequency with low noise. Also shown in FIG. 1, transistor M7 is coupled between node 132 and node 126, current sensor 114 is coupled to the line between node 126 and transistor M7, and the output of current sensor 114 (indicated by CS2) is coupled to a current sensor input of controller 106. Current sensor 114 can be utilized to monitor the current flowing through transistor M7 without consuming a significant amount of current. For example, current sensor 114 can be utilized so as to measure the Rdson resistance of transistor M7 by using a current mirror to determine the current flowing through transistor M7.

Further shown in FIG. 1, transistor M9 is coupled between node 132 and node 136, which also provides electronic system power output 138 (also referred to simply as "system power output 138"). System power output 138 can provide power to an electronic system in an electronic device (not shown in FIG. 1), such as a cell phone, MP3 player, PDA, or other mobile electronic device. Also shown in FIG. 1, transistor M2 is coupled between input power port 140 and node 130, transistor M4 is coupled between nodes 130 and 142, and current sense resistor 110 is coupled between nodes 142 and 144, which are coupled to inputs of controller 106 via respective lines 146 and 148. Input power port 140 can be coupled to an external power source (not shown in FIG. 1), such as AC power adaptor or a USB port on a computer. Current sense resistor 110 can be utilized to sense the current flowing through transistor M4 by measuring the voltage drop across current sense resistor 110 via lines 146 and 148. Line 148 also provides feedback from I/O power port 150 to controller 106.

I/O power port 150 can be coupled to a USB port on a computer or other external power source. I/O power port 150 can also be coupled to an electronic device, such as a USB OTG (On The Go) device, including a USB hard drive or flash memory device. In an embodiment in which multi-mode PMU 102 resides in a cell phone, I/O power port 150 may be coupled to another cell phone, for example. Further shown in FIG. 1, transistor M5 is coupled between node 132 and node 144 and backlight LEDs 118 are coupled between node 144 and LED driver 120. Backlight LEDs 118 provide back lighting for a display, such as a liquid crystal display (LCD), which can reside in a mobile electronic device, such as a cell phone, MP3 player, or PDA. If an electronic device, such as a USB OTG device, is coupled to I/O power port 150 and backlight LEDs 118 are utilized, the voltage at node 144 can be regulated at approximately 5.0 volts and the current flowing through backlight LEDs 118 can be regulated by LED driver 120. If an electronic device is not coupled to I/O power port 150 and backlight LEDs 118 are utilized, the current flowing through backlight LEDs 118 still requires regulation by LED driver 120, but the voltage at node 144 can be an unregulated voltage as low as 3.5 volts.

Also shown in FIG. 1, transistor M8 is coupled between node 132 and camera flash 122 and camera flash 122 is coupled between transistor M8 and ground 124. In the present embodiment, camera flash 122 can comprise an LED. In another embodiment, camera flash 122 can comprise a flash device other than an LED. Further shown in FIG. 1, current sensor 116 is coupled to the line between transistor M8 and camera flash 122, and the output of current sensor 116 (indicated by CS3) is coupled to a current sensor input of controller 106. Current sensor 116 can be utilized to monitor the flash current drawn by camera flash 122 by monitoring the current flowing through transistor M8 and it (i.e. current sensor 116) without consuming a insignificant amount of current. For example, current sensor 116 can be utilized to measure the Rdson resistance of transistor M8 by using a current mirror so as to determine the current flowing through transistor M8.

Also shown in FIG. 1, controller 106 provides control signals to the gates of transistors M1 through M9 via respective lines of bus 152. Further shown in FIG. 1, the outputs of current sensors 112, 114, and 116 are provided to separate current sensor inputs of controller 106 via respective lines of bus 154, node 126 is coupled to a battery feedback input of controller 106 via line 156, and node 136 is coupled to a system feedback input of controller 106 via line 158. Controller 106 can be configured to set each of the power modes of multi-mode PMU 102 by controlling the switching of transistors M1 through M9 via the control signals provided to the respective gates of the transistors. The operation of multi-mode PMU 102 in different power modes is discussed below in relation to FIGS. 2, 3, 4, 5, 6, and 7.

Figure 2:
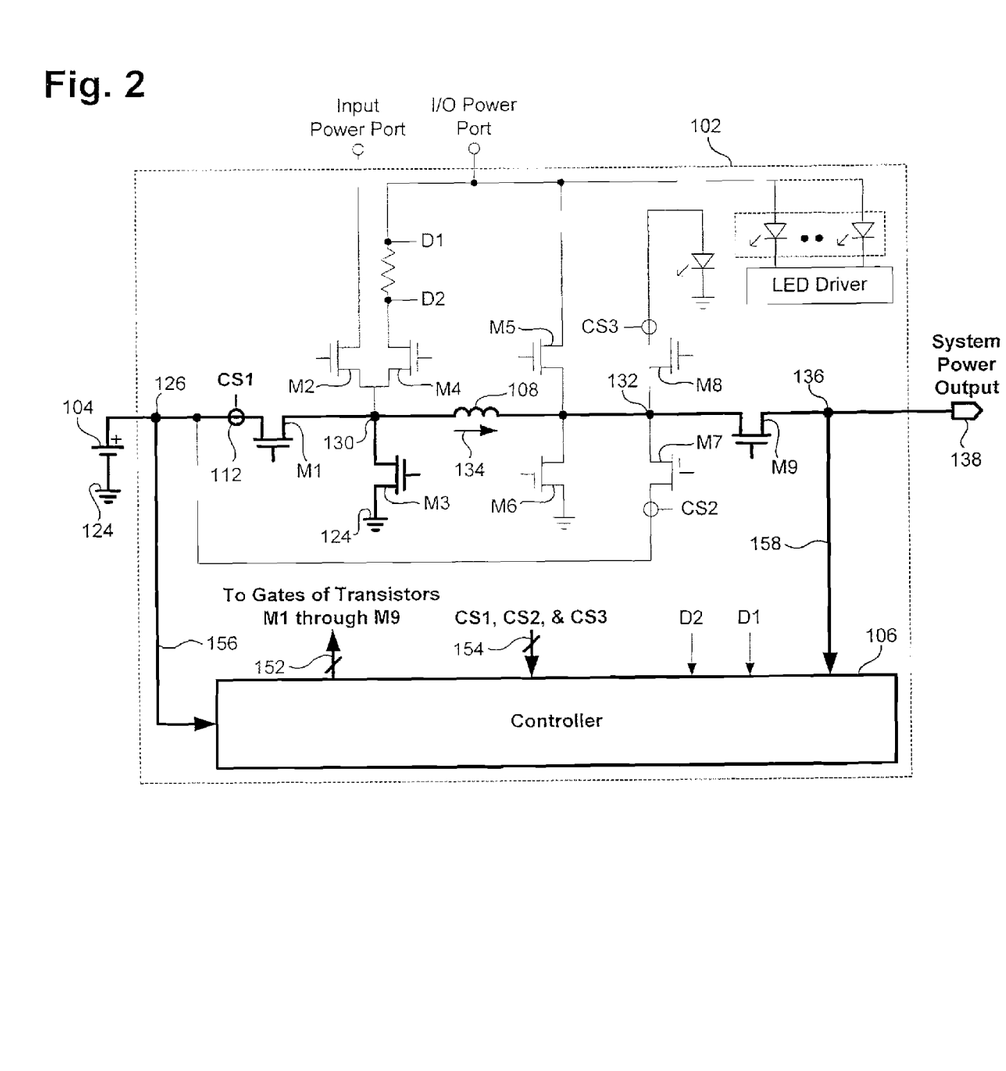
FIG. 2 illustrates a battery-to-electronic system power mode of the exemplary multi-mode PMU in FIG. 1 in a buck configuration in accordance with one embodiment of the present invention.

FIG. 2 shows a portion of multi-mode PMU 102 in FIG. 1 utilized in a battery-to-electronic system power mode using a buck configuration in accordance with one embodiment of the present invention. In FIG. 2, the portion of multi-mode PMU 102 in FIG. 1 that is utilized in the battery-to-electronic system power mode (simply referred to as "the power mode in FIG. 2") is indicated by bold lines. In the power mode in FIG. 2, a switchable conductive path is provided that extends from battery 104 through transistor M1, shared inductor 108, and transistor M9 to system power output 138, which can provide output power to, for example, an electronic system in an electronic device, such as a cell phone. In the power mode in FIG. 2, battery 104 can have a higher voltage than a required system voltage at system power output 138. For example, battery 104 can have a voltage of approximately 4.2 volts and the required system voltage can be approximately 3.3 volts. As a result, the power mode in FIG. 2 uses a buck configuration to reduce the voltage of battery 104 to the required system voltage at node 136.

In multi-mode PMU 102, controller 106 can be configured to set the power mode in FIG. 2 using a buck configuration by turning transistor M9 on and appropriately switching of transistors M1 and M3 on and off to convert the voltage of batter 104 to a lower required system voltage at system power output 138. During the power mode in FIG. 2, current flow can flow through shared inductor 108, which resides in the switchable conductive path provided between battery 104 and system power output 138 and transistors M2, M4, M5, M6, M7, and M8 can be turned off by controller 106.

Figure 3:
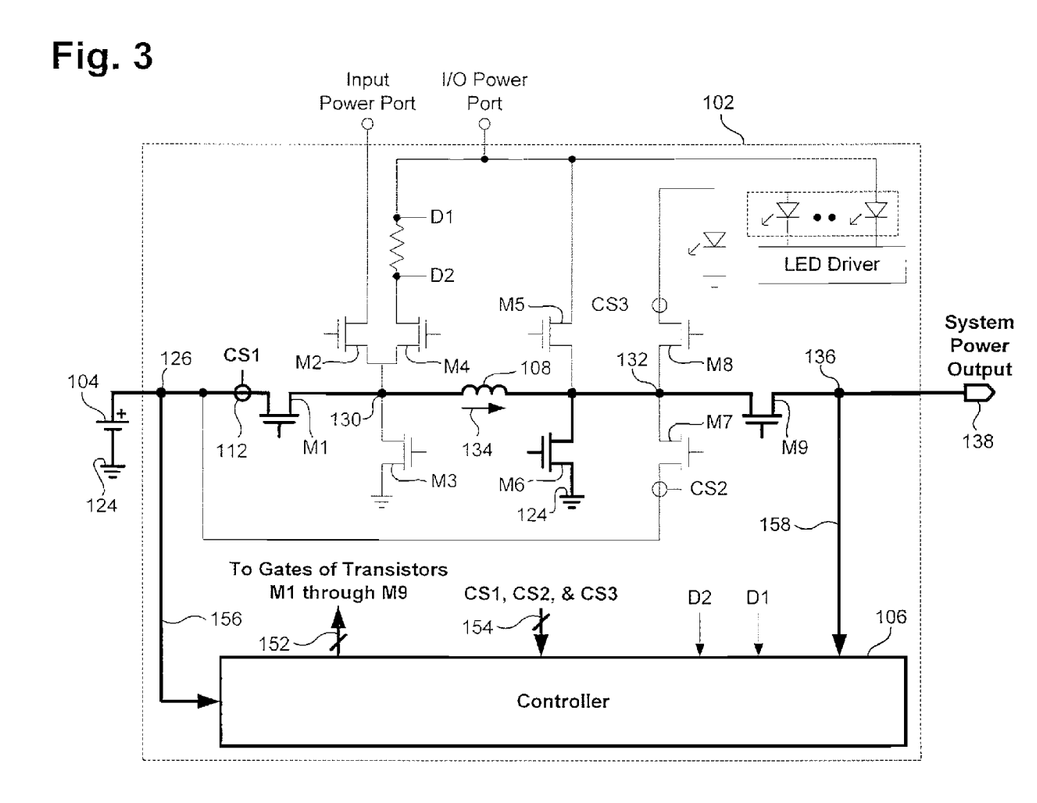
FIG. 3 illustrates a battery-to-electronic system power mode of the exemplary multi-mode PMU in FIG. 1 in a boost configuration in accordance with one embodiment of the present invention.

FIG. 3 shows a portion of multi-mode PMU 102 in FIG. 1 utilized in a battery-to-electronic system power mode using a boost configuration in accordance with one embodiment of the present invention. In FIG. 3, the portion of multi-mode PMU 102 in FIG. 1 that is utilized in the battery-to-electronic system power mode (simply referred to as "the power mode in FIG. 3") is indicated by bold lines. In the power mode in FIG. 3, a switchable conductive path can be provided that extends from battery 104 through transistor M1, shared inductor 108, and transistor M9 to system power output 138, which can provide output power to, for example, an electronic system of an electronic device, such as a cell phone. In contrast to the power mode in FIG. 2, in the power mode in FIG. 3, battery 104 has a lower voltage than a required system voltage at system power output 138. For example, battery 104 can have a voltage of approximately 2.5 volts and the required system voltage can be approximately 3.3 volts. As a result, the power mode in FIG. 3 uses a boost configuration to increase the voltage of battery 104 to the required system voltage at node 136.

In multi-mode PMU 102, controller 106 can be configured to set the power mode in FIG. 3 using a boost configuration by turning transistor M1 on and appropriately switching transistors M6 and M9 on and off to convert the voltage of batter 104 to a higher required system voltage at system power output 138. During the power mode in FIG. 3, current can flow through shared inductor 108, which resides in the switchable conductive path provided between battery 104 and system power output 138, and transistors M2, M3, M4, M5, M7, and M8 can be turned off by controller 106.

Figure 4:
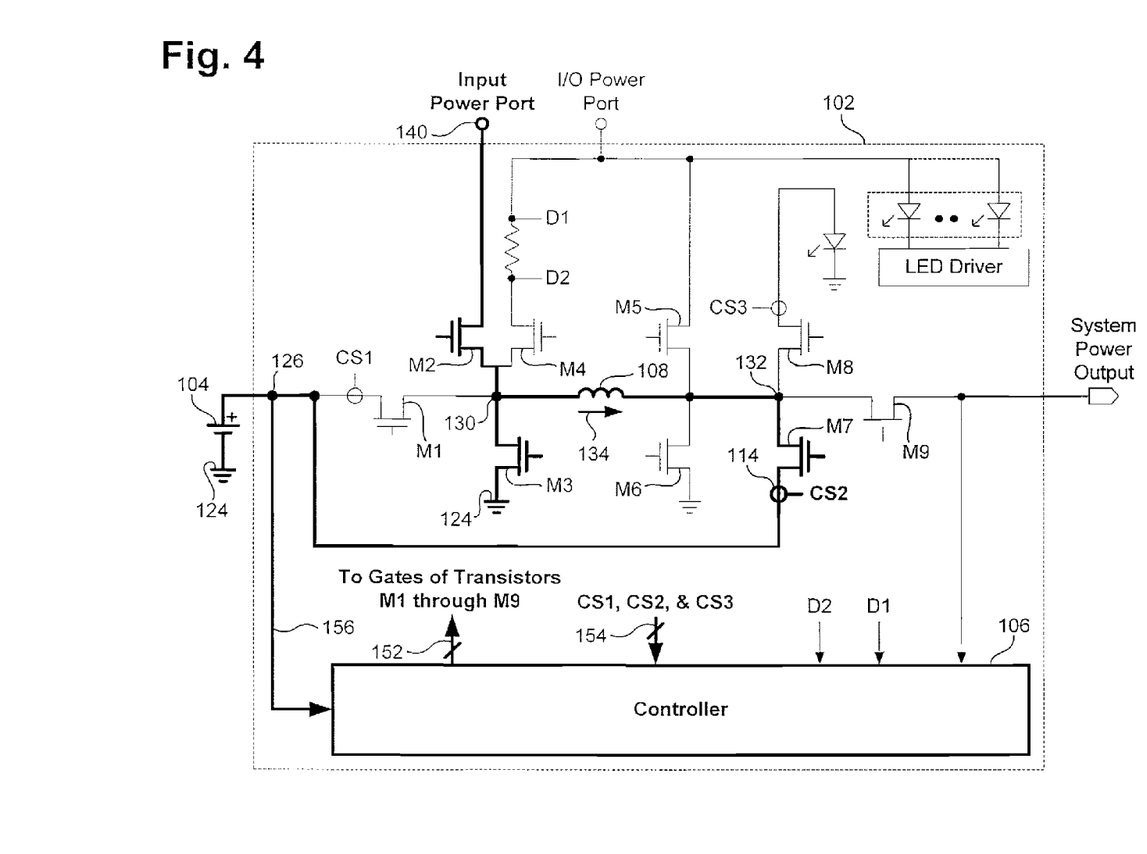
FIG. 4 illustrates a charge-battery power mode of the exemplary multi-mode PMU in FIG. 1 in accordance with one embodiment of the present invention.

FIG. 4 shows a portion of multi-mode PMU 102 in FIG. 1 utilized in a charge-battery power mode in accordance with one embodiment of the present invention. In FIG. 4, the portion of multi-mode PMU 102 in FIG. 1 that is utilized in the charge-battery power mode (simply referred to as "the power mode in FIG. 4") is indicated by bold lines. In the power mode in FIG. 4, battery 104 can be charged by an external power source (not shown in FIG. 4), such as an AC power adapter or a USB port on a computer, which is coupled to input power port 140. In the power mode in FIG. 4, a switchable conductive path is provided that extends from input power port 140 through transistor M2, shared inductor 108, and transistor M7 to battery 104 to enable battery 104 to be charged by an external power source coupled to input power port 140.

In multi-mode PMU 102, controller 106 can be configured to set the power mode in FIG. 4 by turning transistor M7 on and appropriately switching transistors M2 and M3 on and off to charge battery 104 from the external power source coupled to input power port 140. During the power mode in FIG. 4, current flow can flow through shared inductor 108, which resides in the switchable conductive path provided between input power port 140 and battery 104, and transistors M1, M4, M5, M6, M8, and M9 can be turned off by controller 106. Thus, since transistor M9 is turned off in the charge-battery power mode in FIG. 4, power is not provided at system power output 138.

Figure 5:
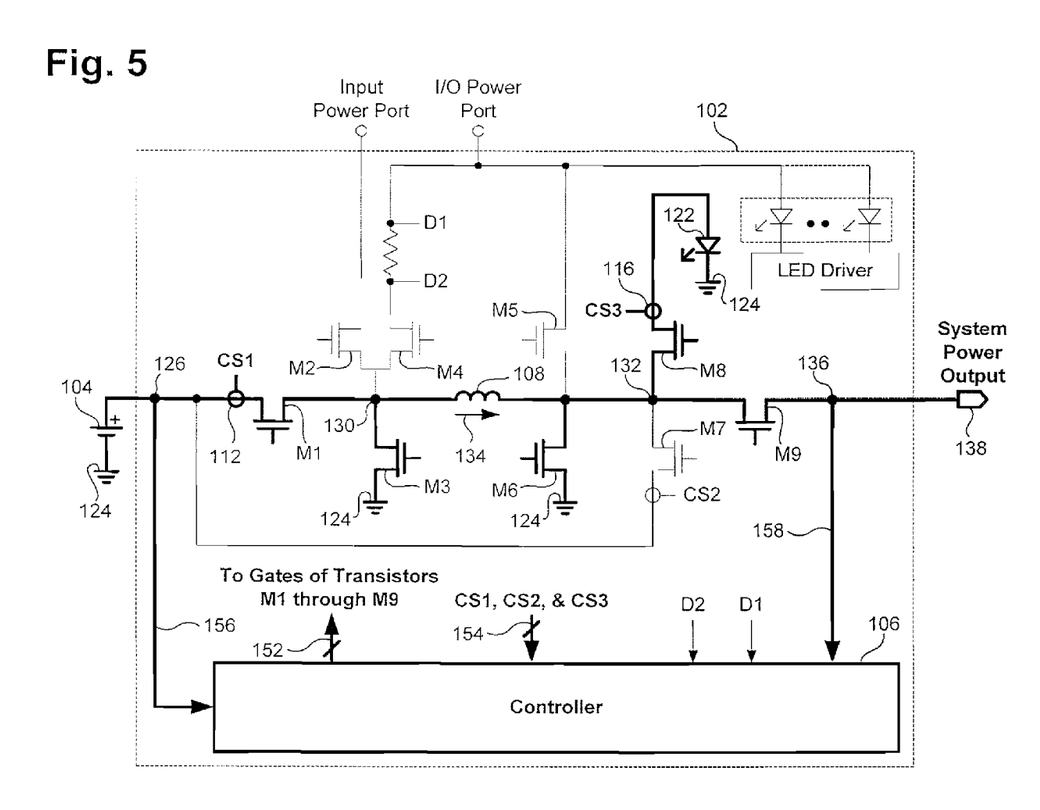
FIG. 5 illustrates a battery-to-electronic system/camera flash power mode of the exemplary multi-mode PMU in FIG. 1 in accordance with one embodiment of the present invention.

FIG. 5 shows a portion of multi-mode PMU 102 in FIG. 1 utilized in a battery-to-electronic system/camera flash power mode in accordance with one embodiment of the present invention. In FIG. 5, the portion of multi-mode PMU 102 in FIG. 1 that is utilized in the battery-to-electronic system/camera flash power mode (simply referred to as "the power mode in FIG. 5") is indicated by bold lines. The power mode in FIG. 5 utilizes a first cycle to provide power from battery 104 to system power output 138 and a second cycle to provide power from battery 104 to camera flash 122. In the power mode in FIG. 5, battery 104 can have a higher voltage than a required system voltage at system power output 138. For example, battery 104 can have a voltage between 3.3 volts and 3.6 volts and the required system voltage can be approximately 3.3 volts.

In multi-mode PMU 102, controller 106 can be configured to set the first cycle of the power mode in FIG. 5 using a buck configuration, wherein controller 106 appropriately switches transistors M1 and M3 on and off while turning transistor M9 on, thereby converting a voltage of battery 104 to a lower required system voltage at system power output 138. In the first cycle of the power mode in FIG. 5, controller 106 uses a switchable conductive path extending from battery 104 through transistor M1, shared inductor 108, and transistor M9 to system power output 138. The system voltage can be regulated in the first cycle by appropriately modulating the turn on time of transistors M1 and M3 while transistor M9 is turned on. In the first cycle of the power mode in FIG. 5, transistors M2, M4, M5, M6, M7, and M8 can be turned off by controller 106.

Controller 106 can be further configured to set the second cycle of the power mode in FIG. 5 using a boost configuration, wherein controller 106 appropriately switches transistors M6 and M8 on while turning transistor M1 on, thereby converting a voltage of battery 104 to a higher voltage required by camera flash 122. In the second cycle of the power mode in FIG. 5, controller 106 uses a switchable conductive path extending from battery 104 through transistor M1, shared inductor 108, and transistor M8 to camera flash 122. The average flash current can be monitored by current sensor 116 and regulated by, for example, modulating the turn on time of transistors M6 and M8 with transistor M1 switched on.

Figure 6:
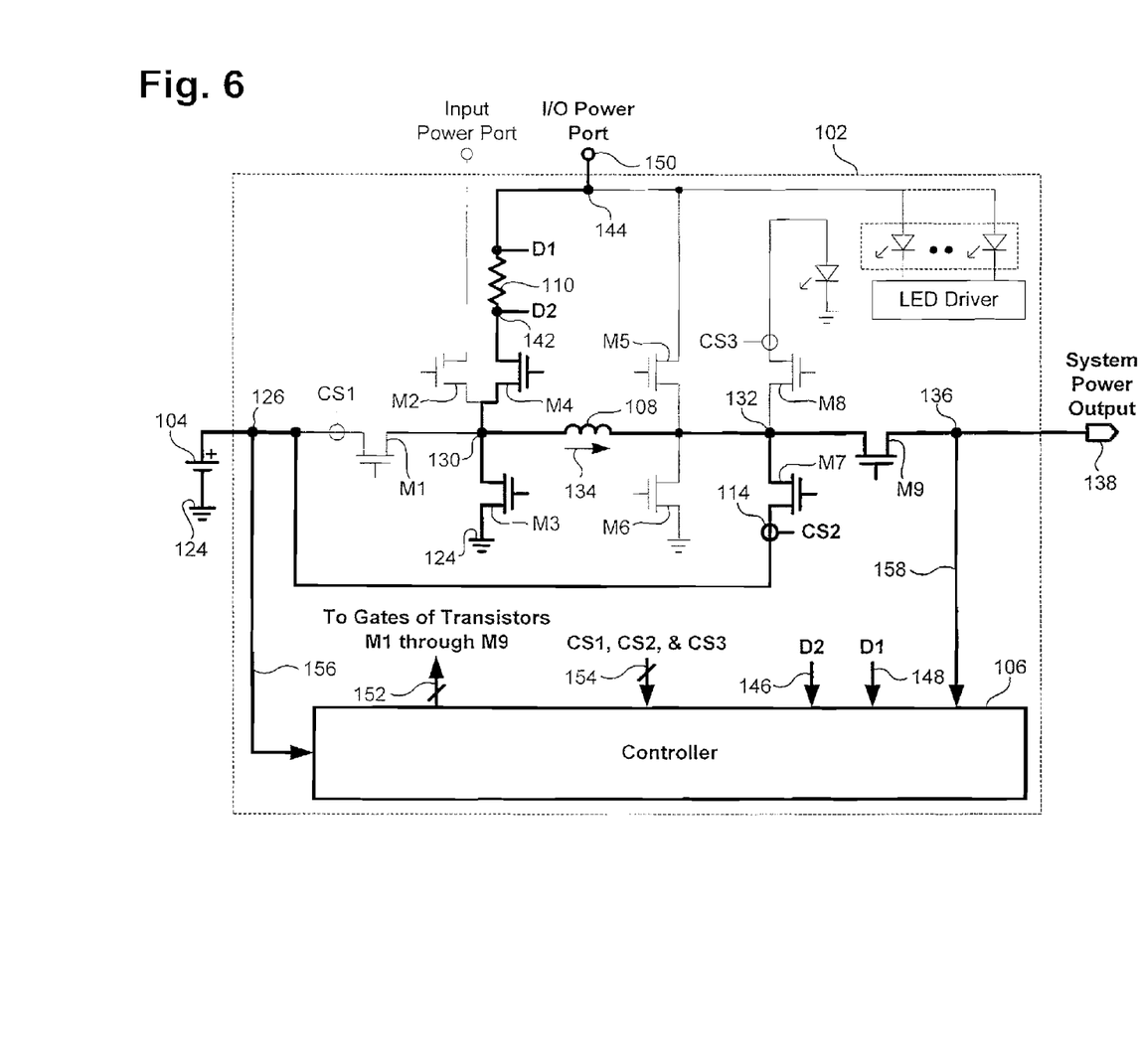
FIG. 6 illustrates a power port-to-electronic system/battery power mode of the exemplary multi-mode PMU in FIG. 1 in accordance with one embodiment of the present invention.

FIG. 6 shows a portion of multi-mode PMU 102 in FIG. 1 utilized in a power port-to-electronic system/battery power mode in accordance with one embodiment of the present invention. The portion of multi-mode PMU 102 in FIG. 1 that is utilized in the a power port-to-electronic system/battery power mode in FIG. 6 (hereinafter "the power mode in FIG. 6") is indicated by bold lines. The power mode in FIG. 6 utilizes a first cycle to provide power from an external power source (not shown in FIG. 6), such as a computer USB port or a USB OTG device, coupled to I/O power port 150 to an electronic system coupled to system power output 138 and a second cycle to charge battery 104 from the external power source. In the power mode in FIG. 6, the electronic system at system power output 138 can require, for example, a voltage of approximately 3.3 volts and the external power source can provide a voltage of, for example, between 4.5 volts and 5.5 volts at I/O power port 150.

In multi-mode PMU 102, controller 106 can be configured to set the first cycle of the power mode in FIG. 6 using a buck configuration in a similar manner as discussed above in the first cycle of the power mode in FIG. 5. Controller 106 can be further configured to set the second cycle of the power mode in FIG. 6, wherein controller 106 appropriately switches transistors M3 and M4 on and off while turning on transistor M7. In the second cycle of the power mode in FIG. 6, controller 106 uses a switchable conductive path extending from I/O power port 150 through current sense resistor 110, transistor M4, shared inductor 110 and transistor M7 to battery 104. In the second cycle of the power mode in FIG. 6, current sense resistor 110 can be utilized to sense the current flowing out of I/O power port 150 to ensure that the current does not exceed a maximum specified current rating of the external power source, such as a USB computer port, coupled to I/O power port 150. The charging current drawn by battery 104 in the second cycle of the power mode in FIG. 6 can be monitored by current sensor 114.

Figure 7:
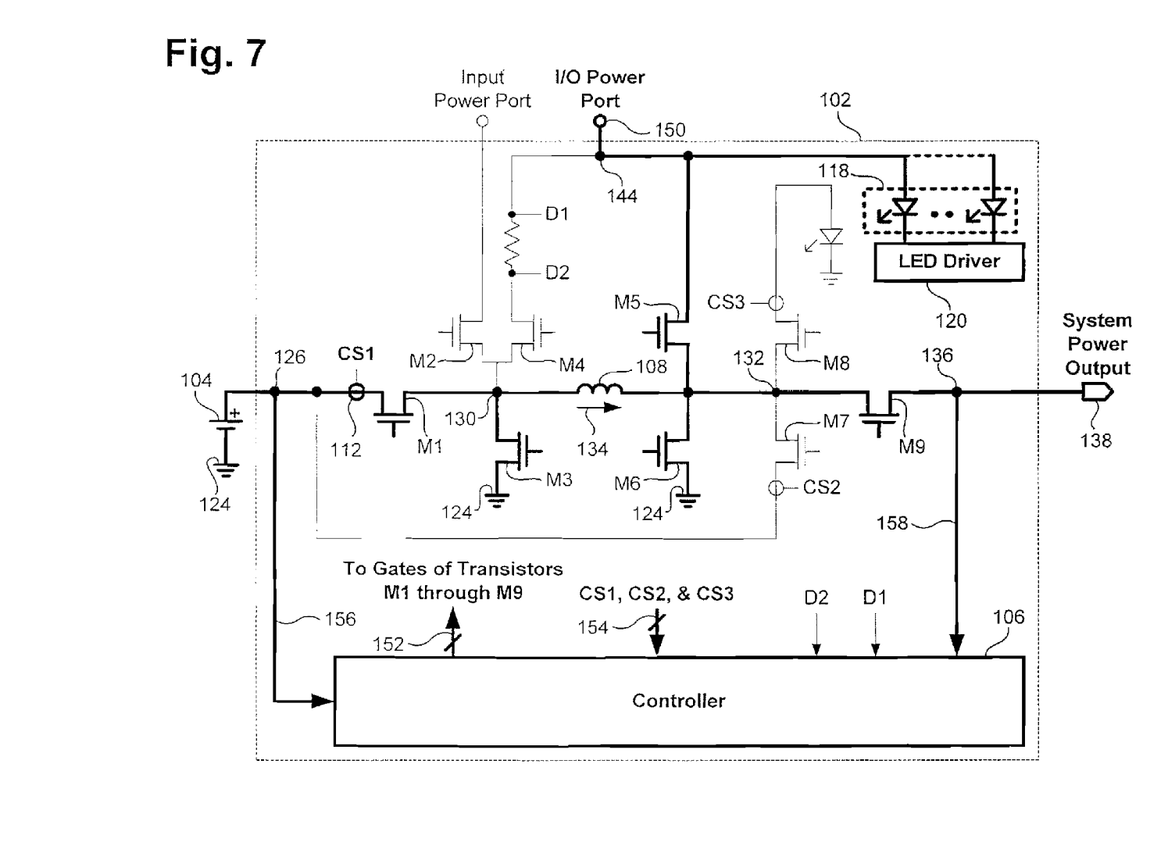
FIG. 7 illustrates a battery-to-electronic system/backlight LED power mode of the exemplary multi-mode PMU in FIG. 1 in accordance with one embodiment of the present invention.

FIG. 7 shows a portion of multi-mode PMU 102 in FIG. 1 utilized in a battery-to-electronic system/backlight LED power mode in accordance with one embodiment of the present invention. In FIG. 7, the portion of multi-mode PMU 102 in FIG. 1 that is utilized in the battery-to-electronic system/backlight LED power mode (simply referred to as "the power mode in FIG. 7") is indicated by bold lines. The power mode in FIG. 7 utilizes a first cycle to provide power from battery 104 to system power output 138, which can provide power to an electronic system, and a second cycle to provide power from battery 104 to backlight LEDs 118 and/or an electronic device, such as a USB OTG device or other USB device, coupled to I/O power port 150. In the power mode in FIG. 7, an electronic system coupled to system power output 138 can require a system voltage that is less than the voltage of battery 104 and backlight LEDs 118 can require a voltage that is greater than the battery voltage. For example, the electronic system can require a voltage of approximately 3.3 volts and battery 104 can have a voltage that is greater than 3.3 volts.

If an electronic device such as a USB OTG device is coupled to I/O power port 150, a regulated voltage of approximately 5.0 volts is required at node 144 to power the electronic device. The regulated voltage of approximately 5.0 volts can also be utilized to provide power to backlight LEDs 118 when, for example, a USB OTG device is coupled to I/O power port 150. If an electronic device, such as a USB OTG device or other type of USB device, is not coupled to I/O power port 150, backlight LEDs 118 can receive an unregulated voltage that is less than 5.0 volts, such as an unregulated voltage of 4.0 volts or less. When backlight LEDs 118 are powered by, for example, battery 104, the current flowing through backlight LEDs 118 can be controlled by LED driver 120.

In multi-mode PMU 102, controller 106 can be configured to set the first cycle of the power mode in FIG. 7 using a buck configuration in a similar manner as discussed above in the first cycle of the power mode in FIG. 5. using a buck configuration, wherein controller 106 appropriately switches transistors M1 and M3 on and off while turning transistor M9 on, thereby converting a voltage of battery 104 to a lower required system voltage at system power output 138. In the first cycle of the power mode in FIG. 7, controller 106 uses a switchable conductive path extending from battery 104 through transistor M1, shared inductor 108, and transistor M9 to system power output 138. The system voltage can be regulated in the first cycle by appropriately modulating the turn on time of transistors M1 and M3 while transistor M9 is turned on. In the first cycle of the power mode in FIG. 7, transistors M2, M4, M5, M6, M7, and M8 can be turned off by controller 106.

Controller 106 can be further configured to set the second cycle of the power mode in FIG. 7 using a boost configuration, wherein controller 106 appropriately switches transistors M5 and M6 on and off while turning transistor M1 on, thereby converting a voltage of battery 104 to a higher voltage required at node 144 to power backlight LEDs 118 and/or an electronic device, such as a USB OTG device, coupled to I/O power port 150. In the second cycle of the power mode in FIG. 7, controller 106 uses a switchable conductive path extending from battery 104 through transistor M1, shared inductor 108, and transistor M5 to node 144, which is coupled to I/O power port 150 and backlight LEDs 118. The voltage at I/O power port 150 can be regulated by appropriately modulating the turn on time of transistors M5 and M6 with transistor M1 turned on. In the second cycle of the power mode in FIG. 7, transistors M2, M3, M4, M7, M8, and M9 can be are turned off by controller 106.

Figure 8:
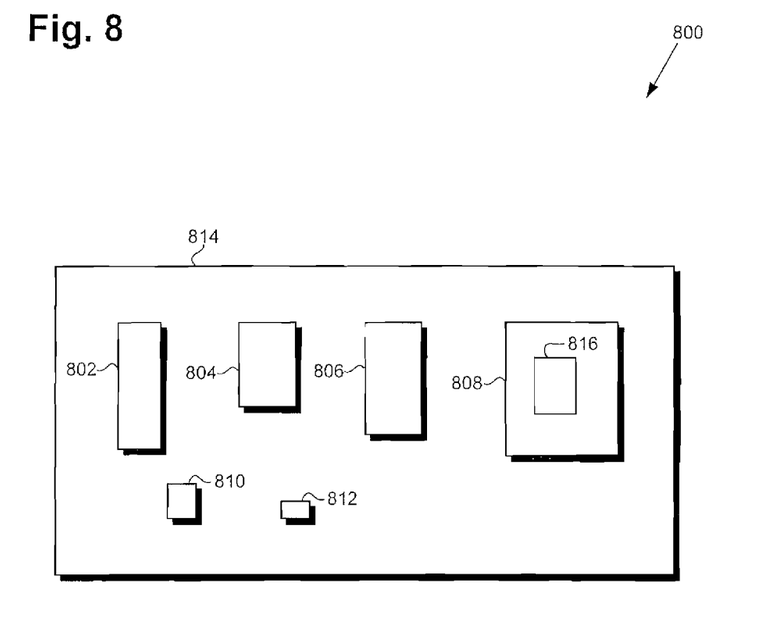
FIG. 8 is a diagram of an exemplary electronic system including an exemplary chip or die utilizing a multi-mode PMU in accordance with one embodiment of the present invention.

FIG. 8 illustrates a diagram of an exemplary electronic system including an exemplary chip or die utilizing a multi-mode PMU in accordance with one embodiment of the present invention. Electronic system 800 includes exemplary modules 802, 804, and 806, IC chip or semiconductor die 808, discrete components 810 and 812, residing in and interconnected through circuit board 814. In one embodiment, electronic system 800 may include more than one PCB. IC chip 808 includes circuit 816, which can comprise a multi-mode PMU, such as multi-mode PMU 102, including a shared inductor, such as shared inductor 108, as described above.

As shown in FIG. 8, modules 802, 804, and 806 are mounted on circuit board 814 and can each be, for example, a central processing unit (CPU), a graphics controller, a digital signal processor (DSP), an application specific integrated circuit (ASIC), a video processing module, an audio processing module, an RF receiver, an RF transmitter, an image sensor module, a power control module, an electro-mechanical motor control module, or a field programmable gate array (FPGA), or any other kind of module utilized in modern electronic circuit boards. Circuit board 814 can include a number of interconnect traces (not shown in FIG. 8) for interconnecting modules 802, 804, and 806, discrete components 810 and 812, and IC chip 808.

Also shown in FIG. 8, IC chip 808 is mounted on circuit board 814 and can be, for example, any chip utilizing an embodiment of the invention's multi-mode PMU. In one embodiment, IC chip 808 may not be mounted on circuit board 814, and may be interconnected with other modules on different circuit boards. As stated above, circuit 816 is situated in IC chip 808 and comprises an embodiment of the invention's multi-mode PMU. Further shown in FIG. 8, discrete components 810 and 812 are mounted on circuit board 814 and can each be, for example, a discrete filter, such as one including a BAW or SAW filter or the like, a power amplifier or an operational amplifier, a semiconductor device, such as a transistor or a diode or the like, an antenna element, an inductor, a capacitor, or a resistor.

Electronic system 800 can be utilized in, for example, a wired or wireless communications device, a cell phone, a switching device, a router, a repeater, a codec, a wired or wireless LAN, a WLAN, a Bluetooth enabled device, a digital camera, a digital audio player and/or recorder, a digital video player and/or recorder, a Global Positioning System (GPS) device, a computer, a monitor, a television set, a satellite set top box, a cable modem, a printer, a copier, an RF transceiver, a PDA, a digital game playing device, or in any other kind of system, device, component or module utilized in modern electronics applications.

Thus, as discussed above, the present invention provides a multi-mode PMU having a number of power modes, where each power modes utilizes at least one of a number of switchable conductive paths. The invention's multi-mode PMU includes a shared inductor, which resides in each of the switchable conductive paths. By utilizing a shared inductor, the invention's multi-mode PMU can eliminate a number of separate and distinct inductors that would be required by a conventional PMU to provide multiple power modes. As a result, the invention advantageously achieves a multi-mode PMU that consumes less space in an electronic device, such as a cell phone or other mobile electronic device. Additionally, since electrical current flows through the shared inductor in the same direction in each of the power modes, the invention's multi-mode PMU can advantageously operate at high frequency with low noise.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a multi-mode power management unit with shared inductor has been described.

The invention claimed is:

1. A multi-mode power management unit (PMU) comprising:
   a plurality of switchable conductive paths;
   a shared inductor;
   a controller configured to set one of a plurality of power modes using one of said plurality of switchable conductive paths;
   said plurality of power modes including a battery-to-electronic system power mode and a charge-battery power mode.

2. The multi-mode PMU of claim 1, wherein each of said plurality of switchable conductive paths corresponding to at least one of said plurality of power modes.

3. The multi-mode PMU of claim 1, wherein each of said plurality of switchable conductive paths utilizes said shared inductor.

4. The multi-mode PMU of claim 1, wherein said plurality of power modes further includes a battery-to-electronic system/camera flash power mode.

5. The multi-mode PMU of claim 1, wherein said plurality of power modes further includes a power port-to-electronic system/battery power mode.

6. The multi-mode PMU of claim 1, wherein said plurality of power modes further includes a battery-to-electronic system/backlight LED power mode.

7. The multi-mode PMU of claim 6, wherein said battery-to-electronic system/backlight LED power mode includes powering an electronic system from a battery in a first cycle and powering backlight LEDs from said battery in a second cycle.

8. The multi-mode PMU of claim 6, wherein said battery-to-electronic system/backlight LED power mode includes powering an electronic system from a battery in a first cycle and powering backlight LEDs and a USB OTG device from said battery in a second cycle.

9. The multi-mode PMU of claim 1, wherein said battery-to-electronic system power mode utilizes a buck configuration to convert a higher battery voltage to a lower electronic system voltage.

10. The multi-mode PMU of claim 1, wherein said battery-to-electronic system power mode utilizes a boost configuration to convert a lower battery voltage to a higher electronic system voltage.

11. The multi-mode PMU of claim 1, wherein a current flows through said shared inductor in a same direction in each of said plurality of power modes.

12. A semiconductor die comprising a multi-mode power management unit (PMU), said multi-mode PMU comprising:
    a plurality of switchable conductive paths;
    a shared inductor;
    a controller configured to set one of a plurality of power modes using one of said plurality of switchable conductive paths.

13. The semiconductor die of claim 12, wherein said plurality of power modes includes a battery-to-electronic system power mode and a charge-battery power mode.

14. The semiconductor die of claim 12, wherein said plurality of power modes includes a battery-to-electronic system/camera flash power mode.

15. The semiconductor die of claim 12, wherein said plurality of power modes includes a power port-to-electronic system/battery power mode.

16. The semiconductor die of claim 12, wherein said plurality of power modes includes a battery-to-electronic system/backlight LED power mode.

17. The semiconductor die of claim 12, wherein each of said plurality of switchable conductive paths corresponding to at least one of said plurality of power modes.

18. The semiconductor die of claim 12, wherein each of said plurality of switchable conductive paths utilizes said shared inductor.

19. The semiconductor die of claim 12, wherein said multi-mode PMU utilizes a buck configuration to convert a higher battery voltage to a lower electronic system voltage.

20. The semiconductor die of claim 12, wherein said multi-mode PMU utilizes a boost configuration to convert a lower battery voltage to a higher electronic system voltage.

* * * * *